May 6, 1941. M. SEGRE 2,240,864
COUPLING DEVICE FOR TEMPORARY STRUCTURES
Filed Dec. 28, 1939
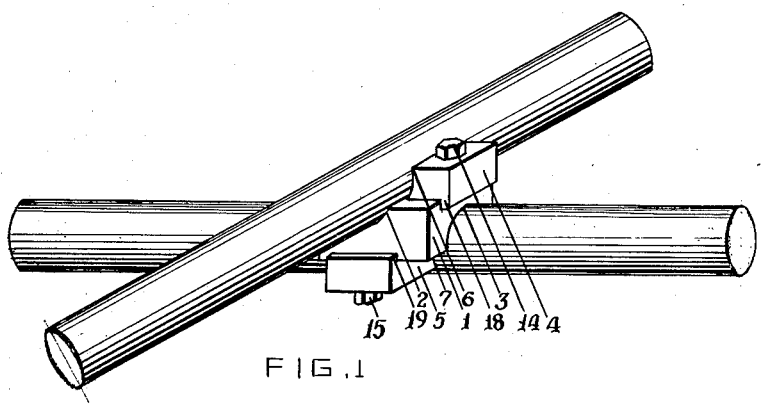
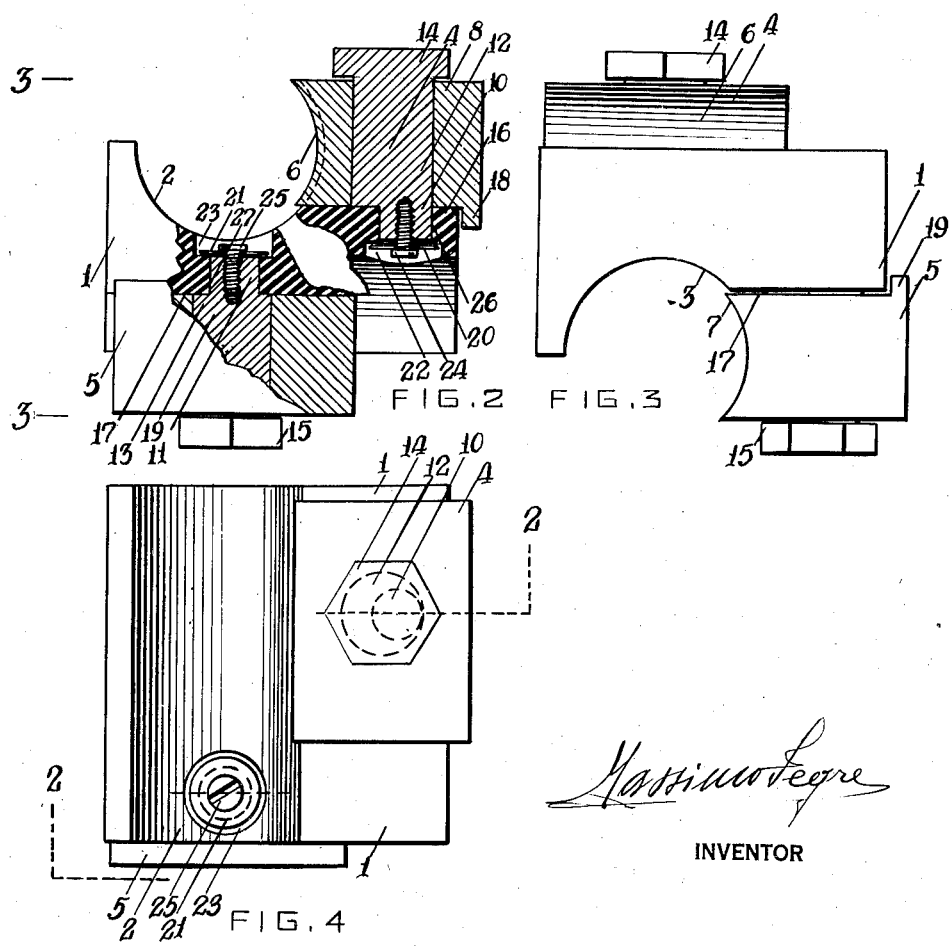
INVENTOR Patented May 6, 1941

2,240,864

UNITED STATES PATENT OFFICE 2,240,864

COUPLING DEVICE FOR TEMPORARY STRUCTURES

Massimo Segre, New York, N. Y.

Application December 28, 1939, Serial No. 311,267

7 Claims. (Cl. 304—40)

This invention relates to devices for rigidly coupling elements used in the erection of scaffolding and other temporary structures in fixed angular relationship.

The primary object of my invention is to provide a coupling device of a new and improved construction which can be secured to the scaffolding elements and withdrawn therefrom in an easy and rapid way.

Another object is to provide a device of this kind which is particularly simple and economical to construct and is also durable and inconspicuous when mounted in place. A further object is to provide a device of this kind which comprises no bolts and no detachable parts to be removed during the use thereof. Other objects and advantages of my invention will appear from the following description.

The particular embodiment illustrated in the appended drawing and hereinafter described is adapted to couple tubes or cylindrical rods at right angles to each other. In practice this will be the most common case, but other cases will occur in which the angle is not 90° or the shape of the scaffolding elements is not cylindrical, and my invention may be applied to such cases through adaptations which will be apparent to a person skilled in the art.

In the drawing:

Fig. 1 is a perspective view of my coupling device applied to two cylindrical elements.

Fig. 2 is a section taken on the broken line 2—2 of Fig. 4, showing the same device in the clamping position, the cylindrical elements being omitted.

Fig. 3 is a lateral view of the same device, seen in the direction of the arrows in Fig. 2.

Fig. 4 is a plan view of the same device.

In Figs. 2 to 4, the numeral 1 indicates a block, roughly having the form of a parallelepiped, which can be made of any suitable material, a light alloy being preferred. This block is provided with two arcuate recesses arranged at the opposite sides thereof in the desired angular relationship, which, in the particular embodiment shown, are two cylindrical jaws 2 and 3 at right angles to one another. These jaws are so formed that each embraces less than a half of the periphery of the element which is to be gripped by the coupling device, so that said element can be freely introduced in or withdrawn from the jaw by a lateral motion. Since the two jaws have the same shape, dimensions and function, I will illustrate the device by referring to one of them, the jaw 2, and describing the elements cooperating therewith.

There is provided on the block 1 a clamping member 4 which has a concave surface 6 on the side thereof which is nearest to the jaw 2. Said concave surface, like the jaw, has a shape matching that of the scaffolding element in connection with which the device is intended to be used; in this case the concave surface 6 is a portion of a cylindrical surface having the same diameter as the jaw 2. There is further provided a pivot 8 comprising two cylindrical sections, the journal section 10 and the cam section 12, of different diameter and eccentric with respect to each other. The journal section 10 penetrates in a bore 26 of the block 1 and can freely rotate therein, but is secured against longitudinal displacements by means of a flange 20 resting on an abutment 22 of the bore 26. The journal section 10 and the cam section 12 together form the pivot 8 and are rigidly connected by means of the screw 24. It would also be possible to make the pivot of one piece by making the two sections integral with each other, and to secure the whole member against longitudinal displacements by providing the end of the bore 26 with a tapered seat and jolting the end of the journal section to form an enlargement resting on said tapered seat.

There is further provided a head 14 of the pivot which can be engaged by means of a wrench or otherwise to rotate the pivot 8.

The clamping member 4 is pivotally mounted on the cam section 12 of the pivot and can move with respect to the block 1 by sliding along the contact surface 16; this movement is limited by the rib extending for the length of the clamping member, said rib 18 being effective to limit said movement only when there is no scaffolding element mounted in the device.

It is to be noted that the clamping member 4 need not have the same length as the jaw 2: indeed, in the embodiment shown it is considerably shorter. However, its length cannot be reduced below a certain minimum, otherwise the contact surface between clamping member and scaffolding element would be too small and the specific pressure thereon too great. In this case the scaffolding element would be damaged, and a damage would be caused also if the clamping member's surface did not match the surface of said element. Care is taken therefore in my device to effect the clamping through the contact of two identical surfaces.

This is the specific function of the clamping members 4 and 5. Indeed, the pressure of the cam sections 12 and 13 of the pivots might be exerted directly by the cam sections themselves without the cooperation of the clamping members, but in this case the surface of contact would be reduced to a point or, if the surface of the cam sections were made concave, to a line and the specific pressure on this point or line would be very great.

By the arrangement above described, when the head 14 is rotated by means of a wrench or otherwise, the whole pivot 8 rotates around the axis of its journal section 10. During this rotation the cam section 12, which is eccentric with respect to said axis, forces the clamping member 4 to move back and forth sliding along the contact surface 16 between two extreme positions corresponding to the dead center positions of the cam section 12, the mutual distance between these two positions depending on the eccentricity of the cam section.

In the drawing, the clamping member 4 is shown in its innermost, or left as viewed in Fig. 2, extreme position and it is seen that the dimensions of the various parts are so chosen that in said position the clamping member's concave surface does not exactly continue the profile of the jaw 2, but is a little on the left thereof as viewed in Fig. 2, that is, it protrudes slightly within jaw.

Supposing now that a scaffolding member is to be mounted and secured in the jaw 2, the pivot head 14 will be turned so as to bring the clamping member 4 away from the jaw, or toward the right as viewed in Fig. 2, until it is near to its outermost position. Then the scaffolding element may be freely inserted into the jaw by a lateral movement, that is a movement in a direction perpendicular to the element's axis. This is possible because said jaw embraces less than a half of the periphery of said element.

Finally the pivot head 14 is rotated again and the clamping member 4 is brought back toward the jaw, or toward the left as viewed in Fig. 2, until it engages the scaffolding element and firmly grips it. If the scaffolding element's outer surface is exactly of the same diameter as the jaw 2, the final or clamping position will be reached when the clamping surface 6 is in the optimum position shown in dotted lines in Fig. 2, that is in exact continuation of the jaw's surface. But small differences in the diameter of various scaffolding members having theoretically the same diameter are to be foreseen. Therefore the clamping member 4 must be allowed to go a little farther before reaching its innermost position, which is shown in full lines at the left of the optimum position in Fig. 2.

The distance between the two positions described is actually very small and it has been exaggerated in the drawing for the sake of clearness. However it must be such that the clamping member will always engage the scaffolding element before its innermost position is reached, because this latter corresponds to a dead center position of the cam section 12 and, if it were reached, a further rotation of the pivot therefrom, however slight, would not tighten the grip but withdraw the clamping member from engagement with the scaffolding element and release this latter. Nevertheless in the described dead center position the pressure of the scaffolding element itself against the surface of the clamping member could not cause rotation of the pivot 8 and loosening of the grip, because the line of action of said pressure would then pass through the axis of the journal 10 around which the pivot rotates, and so the torque of said pressure, however great the intensity thereof, with respect to said axis would theoretically be zero and practically be negligible.

In practice, as already stated, the device is so constructed that there is a short distance between the engagement or clamping position and the dead center position of the cam section 12, so that said torque will not be zero even theoretically, but it will still be very small and will not be sufficient to cause spontaneous loosening of the clamp's grip.

The description and observations hereinbefore made should be repeated word by word with reference to the jaw 3 and the members cooperating therewith, by simply substituting the numerals 2, 4, 6, 8, 10, 12, 14, 16, 18, 20, 22, 24, 26 respectively with the numerals 3, 5, 7, 9, 11, 13, 15, 17, 19, 21, 23, 25, 27.

It is important to note that the clamping and release of the scaffolding elements are effected by rotating the pivots through an angle of less than 180°, without any other complementary operation. Therefore the time required for such operations is reduced to a minimum and all bolts and screws are eliminated, while no part of the device has to be removed by the operator at any time.

It is also evident that my invention provides a coupling device of simple and economic construction, practical to use, and inconspicuous when mounted on a structure.

While I have described a preferred embodiment of my invention, it is to be understood that I do not want to be limited to the exact details herein set forth, as many variations are possible in individual cases. In particular my device may be used for other purposes than the coupling of cylindrical rods as shown in the drawing, and the geometric shape of the various parts thereof and their construction and arrangement may be suitably modified within the scope of the appended claims.

Likewise, while a scaffolding structure is a typical example of the kind of structures for which my device has been designed, this latter may be put to other uses; so that, while the words "scaffolding element" are often used alone in this specification for the sake of brevity, they should be construed as indicating an element of any temporary structure to which my device may be advantageously applied.

I claim:

1. A device for rigidly coupling two elements of a scaffolding or other temporary structure in angular relationship, comprising a block having two arcuate recesses at the opposite sides thereof; two clamping members having each a concave surface adapted to cooperate with one of said arcuate recesses to hold a scaffolding element in gripping engagement and being of sufficient length so as not to damage said element; and two pivots, each of said pivots comprising a journal mounted on said block and a cam having one of said clamping members mounted thereon, the engagement of each of said clamping members with a scaffolding element and the clamping thereof around said element being brought about by a single rotation of the corresponding pivot.

2. A device for rigidly coupling two elements of a scaffolding or other temporary structure in angular relationship, comprising a block having two arcuate recesses at the opposite sides thereof; two clamping members having each a concave surface adapted to cooperate with one of said arcuate recesses to hold a scaffolding element in gripping engagement and being of sufficient length so as not to damage said element; and two pivots, each of said pivots having two cylindrical sections eccentric with respect to each other, one of said sections of each pivot being hinged in said block and the other of said sections of each pivot having one of said clamping members mounted thereon, the relative eccentricity of said sections being such that a single rotation of either of said pivots through an angle of less than 180° is sufficient to bring the correspondent clamping member from a position wherein it allows of the lateral introduction of a scaffolding element into the device to a position wherein it engages said element and further to create the required clamping pressure.

3. A device for rigidly coupling two elements of a scaffolding or other temporary structure in angular relationship, comprising a block having two arcuate recesses at the opposite sides thereof; two pivots, each of said pivots comprising a journal pivotally mounted in a bore of said block and secured therein to prevent longitudinal displacements of said pivots and a cylindrical cam section eccentric with respect to said journal and integral or rigidly coupled therewith, said cam section of each pivot having mounted thereon and actuating a clamping member having a concave surface adapted to cooperate with one of said arcuate recesses to hold a scaffolding member in gripping engagement, the engagement or clamping position of said clamping members being reached when the corresponding cam section is so near to, though not in, a dead center position that the moment of the clamping pressure with respect to the journal of said cam section is negligible and accidental unclamping of the device is thereby rendered impossible; and means for rotating said pivots to actuate said clamping members.

4. In a device for rigidly coupling two elements of a scaffolding or other temporary structure in angular relationship, the combination of a block having two arcuate recesses at the opposite sides thereof embracing each less than a half of the periphery of the scaffolding element which the coupling device is to engage, and two clamping members non-detachably mounted thereon, each of said clamping members being brought independently of the other and by a single motion thereof from a position in which it cooperates with one of said arcuate recesses to hold a scaffolding element in gripping engagement to another position in which it allows a scaffolding element to be laterally introduced in, or withdrawn from, the coupling device.

5. A device for rigidly coupling two elements of a scaffolding or other temporary structure in angular relationship, comprising a rigid block having two arcuate recesses at the opposite sides thereof embracing each less than a half of the periphery of a scaffolding element; two clamping members adjacent to said arcuate recesses, having each a concave surface adapted to cooperate with one of said arcuate recesses to embrace more than a half of the periphery of a scaffolding element, whereby each scaffolding element is held independently of the other between one of the arcuate recesses of said rigid block and the clamping member adjacent thereto; and means for causing each of said clamping members to slide on the surface of said rigid block between a position in which it so cooperates with the adjacent arcuate recess to hold a scaffolding element in gripping engagement and a position in which it allows a scaffolding element to be laterally introduced in, or withdrawn from, the coupling device.

6. In a device for rigidly coupling two cylindrical elements in angular relationship, the combination of a block having two cylindrical recesses at the opposite sides thereof and two clamping members having each a concave cylindrical surface adapted to cooperate with one of said cylindrical recesses to hold a cylindrical element in gripping engagement, each of said cylindrical recesses and the cooperating concave surface of a clamping member being portions of the same cylindrical surface and embracing less than 180° if taken separately and more than 180° if taken together; and means for causing each of said clamping members to slide on the surface of said block between a position in which it cooperates with the corresponding cylindrical recess and another position in which it allows a scaffolding cylindrical element to be laterally introduced in, or withdrawn from, the coupling device.

7. In a scaffolding clamp, the combination with a block having two arcuate recesses at the opposite sides thereof of two arcuate clamping members adapted to cooperate with said arcuate recesses to hold two scaffolding elements in a fixed positioned relationship; of cam means pivoted in said block and adapted to move each of said clamping members from a position wherein it allows of the lateral introduction of a scaffolding element in the clamp and another position wherein it engages said scaffolding element, said motion of said clamping members being brought about and the clamping pressure being applied thereto by a single rotation of said cam means through an angle of less than 180°; and the clamping position of said cam means being so near to a dead centre that the clamp cannot become accidentally disengaged.

MASSIMO SEGRE.